UNITED STATES PATENT OFFICE.

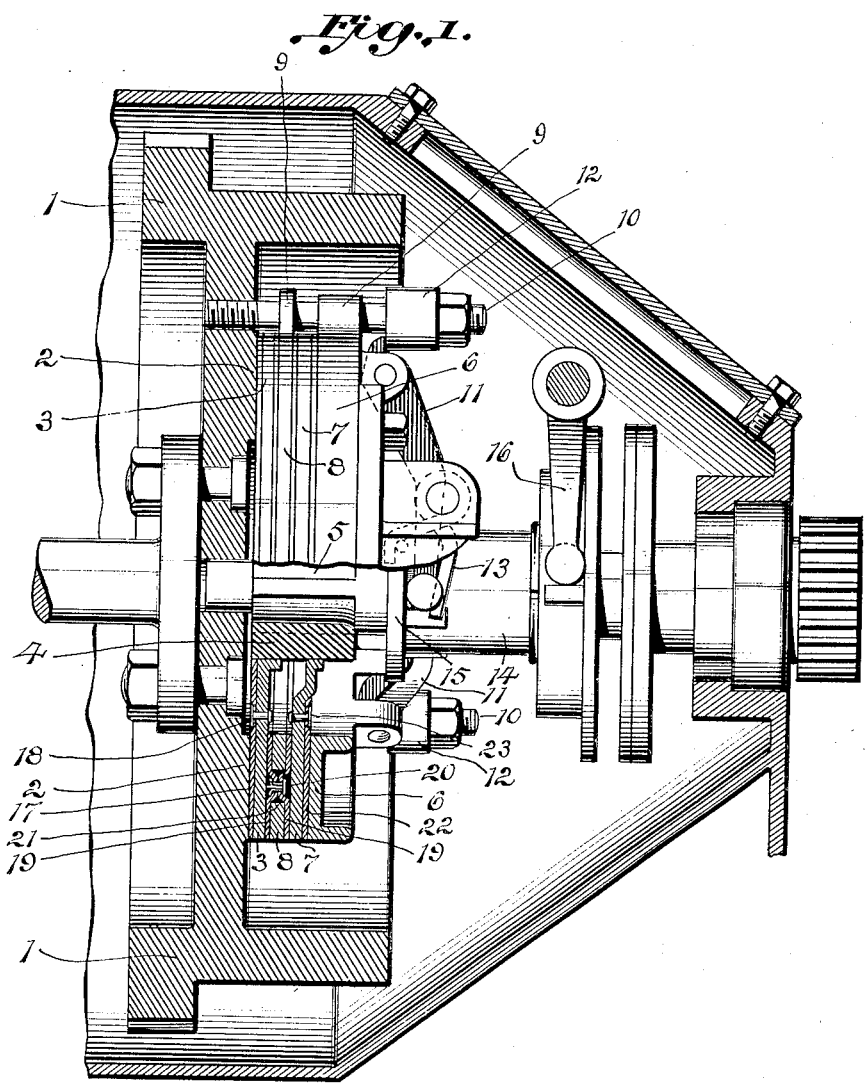

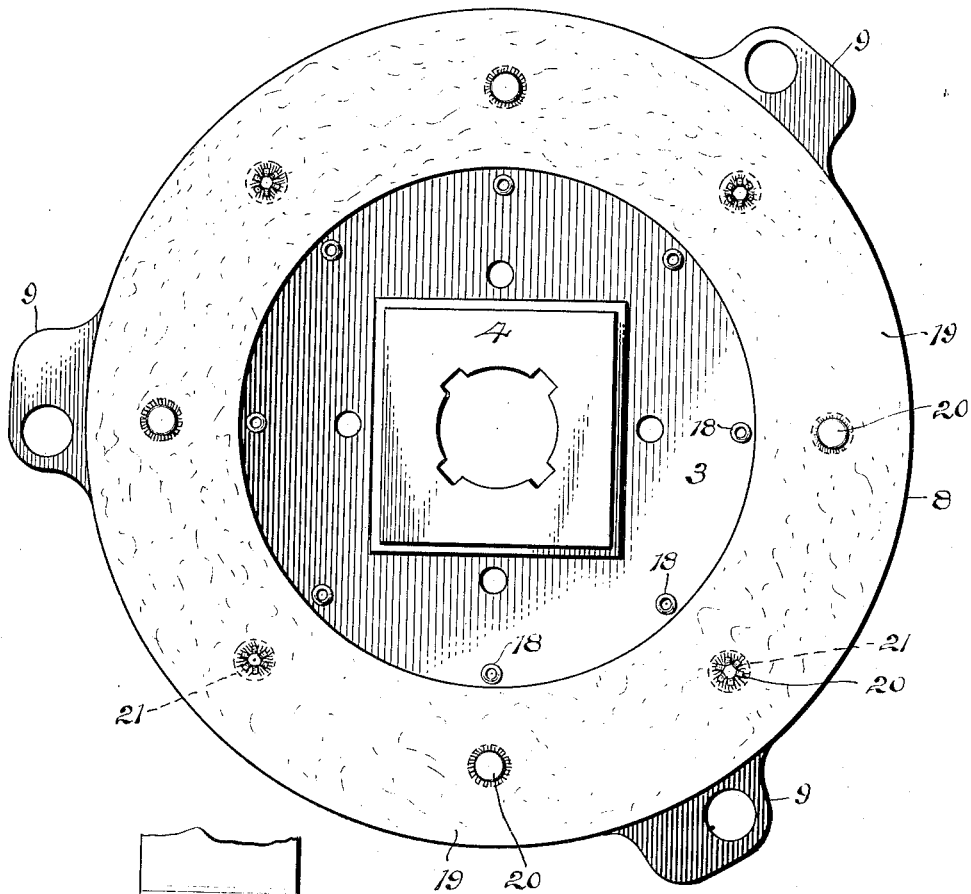
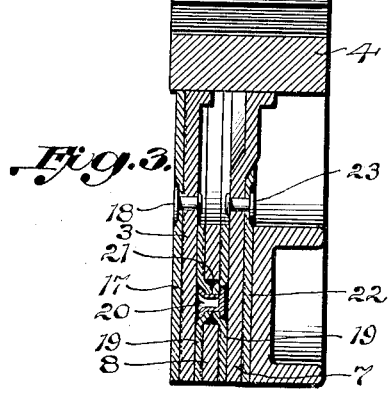
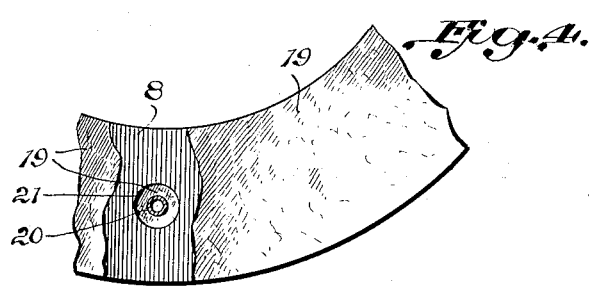

SAMUEL M. D. MILLER, OF DETROIT, MICHIGAN.

CLUTCH.

1,400,565.   Specification of Letters Patent.   Patented Dec. 20, 1921.

Application filed September 3, 1918. Serial No. 252,389.

*To all whom it may concern:*

Be it known that I, SAMUEL M. D. MILLER, a citizen of the United States of America, residing at Detroit, in the county of Wayne and State of Michigan, have invented certain new and useful Improvements in Clutches, of which the following is a specification, reference being had therein to the accompanying drawings.

This invention relates to a friction facing for clutches and to the manner of applying and securing such facing to clutch members, it relating more particularly to the application thereof to the opposed members of a multiple disk clutch.

An object of the invention is to provide a facing having such qualities that when the friction members are brought into contact, they will adhere to one another gradually and smoothly, thereby eliminating "chattering" due to alternate severe adhesion and slippage, and further, which will give sufficient frictional holding power for all load conditions with a minimum requirement of force to bring the surfaces into such frictional contact. A further object is to provide a method and means whereby a fabric facing may be securely fastened in place upon the clutch surfaces and wrinkling or unraveling prevented.

With these and other ends in view, the invention consists in the matters hereinafter set forth and more particularly pointed out in the appended claims, reference being had to the accompanying drawings, in which—

Figure 1 is a longitudinal view of a clutch assembly illustrative of an application of the invention;

Fig. 2 is an elevation of a clutch disk and ring;

Fig. 3 is a sectional detail of the clutch disks and rings; and

Fig. 4 is a detail illustrative of a portion of one of the clutch rings with its fabric facing partially broken away to show the manner of securing the same thereon.

As ordinarily constructed, the friction members of friction clutches are formed of metal or faced with a hard or close grained fibrous material, but it has been found that better results are secured by using an open or porous material, such as a heavy cotton fabric for facing one member, the opposing member having a smooth metal surface to contact the facing. When the smooth metal surface is brought into contact with the fabric facing, adhesion is first resisted by the air or, when the members are run in oil, the lubricant contained in the pores of the facing and thus slight slippage takes place until the air or oil is forced out by the pressure, and chattering is prevented. After the air or oil has been forced out there is strong adhesion of the surfaces and power is transmitted from one member to the other with less liability of slippage than where a compact, close grained facing is used. Less force is therefore required to bring the surfaces into frictional holding contact and sudden adhesion which would impart a jerky movement to a motor car in the mechanism of which such a clutch is embodied, is eliminated, and the operator may throw out the clutch with comparative ease.

Obviously, this invention may be applied to any form of friction clutch, but for the purpose of illustration, a clutch mechanism particularly adapted for use upon motor vehicles is shown, embodying a fly wheel 1 formed with a flat side having a plane annular friction surface 2 to be opposed by a disk 3 mounted upon a hub 4 which is preferably rectangular in cross-section and is secured upon a driven shaft 5 co-axial with the fly wheel. Opposed to the disk 3 is a master ring 6 with a second disk 7 and friction ring 8 interposed between said master ring and disk 3, but if found desirable, said disk 7 and ring 8 may be dispensed with. The rings 6 and 8 are provided with ears 9 having holes to receive studs 10 fixed in the fly wheel so that these rings are centered relative to the disks and carried by the fly wheel. Levers 11 on the master ring engage collars 12 on the studs, and a spring or springs 13 acting upon the long arms of said levers, turn said levers upon their pivotal connections with the master ring with their short arms in engagement with the collars 12 and force said master ring toward the fly wheel, clamping the disks and ring 8 between it and the surface 2 of the fly wheel, said rings and disks being free to move longitudinally upon said studs 10 and hub 4, respectively. A sleeve 14 slidable upon the shaft 5 has a flange 15 to engage the long arms of the levers 11 and move said levers against the action of the springs, said sleeve being moved longitudinally by a lever 16 which may be operated in any convenient manner as by a foot-pedal (not shown) to release the clutch.

All of the above described parts and their arrangement and operation are old and well known, the same being merely illustrative of a form of multiple disk clutch, but to the rings and disks of which are applied facings embodying this invention.

A facing 17 of woven fabric, such as heavy cotton duck, is applied to the face of the disk 3 which opposes the surface 2 of the fly wheel and this facing is firmly secured in place by a row of rivets 18 passing through the disk and located inside the inner edge of the friction surface 2 so that the heads of these rivets will not contact said surface. This facing is further secured to the face of the disk by a suitable cement which also prevents the raw edge of the fabric from unraveling.

The ring 8 is faced on both sides with fabric of a width equal to the ring and these facings 19 are also cemented in place and secured by a plurality of rivets 20 passing through openings 21 in the ring and through the two thicknesses of fabric which is drawn into the openings and fastened together therein by the rivets which thus lie wholly between the two planes of the outer surfaces of the facings. The plane surfaces of the two disks 3 and 7 which oppose the facings of the ring 8 will therefore, not contact the rivet heads and the facings are securely anchored to the ring. The disk 7 is similar to the disk 3 and is provided with a fabric facing 22 similar to the facing 17 to be engaged by the master ring. This facing 22 is secured in place by cement and by a row of rivets 23 similar to the rivets 18, located inside the inner edge of the master ring where their heads will not come in contact with said ring or interfere with the intermediate ring 8 or its facing. In this construction the rivets cannot interfere with the contact between the friction surfaces as these surfaces wear away, and the facing is securely held smoothly and evenly in place.

The facings 17, 19 and 22 are all annular in form and in their manufacture are cut or blanked from a sheet of woven fabric having longitudinal and transverse fibers so that the fibers of the annular facings will extend transversely of the axis of the annular facings, and a single thickness of this material is secured upon the several faces of the disks to frictionally contact the several plane faces of the disks.

Having thus fully described my invention, which I claim is:—

1. In a multiple disk clutch, the combination with a plurality of metal disks, of a facing for certain of said disks to oppose the metallic surface of other of said disks, comprising an annular piece of woven fabric of a single thickness blanked from fabric having transverse and longitudinal fibers, whereby the fibers of the annular piece will extend transversely of the axis thereof, and means for securing said annular piece upon the plane face of the metallic disk.

2. In a friction clutch having opposed friction members, a facing of woven fabric for one of said members, and a plurality of fastening members for securing said facing to said member located outside the area of said facing which is contacted by said other member.

3. In a friction clutch having opposed friction members, a facing cemented to one of said members, and rivets passing through said facing and member outside the area of said facing which is contacted by the other member.

4. In a multiple disk clutch, the combination of a plurality of opposed disk-like members, one of which members is formed with openings, a facing upon opposite faces of said member having openings, and means within each opening for drawing the facings into contact through said openings and securing them together therein.

5. In a multiple disk clutch, the combination of a plurality of opposed disk-like members, one of which members is formed with openings, a woven fabric facing upon opposite faces of the member having the openings, and rivets passing through and securing the facings together within the openings, said openings being each of greater area than the area of either head of each rivet.

6. In a multiple disk clutch, the combination of a plurality of opposed disk-like members, one of which members is formed with openings, a woven fabric facing upon opposite faces of the member having the openings, and fastening means within each opening passing through and securing the facings together and in contact with each other within said openings and within the plane of the member.

7. In a multiple disk clutch, the combination of disks and a ring having openings interposed between the disks, a facing of cotton duck for one side of each disk, a plurality of rivets passing through each disk and its facing outside the frictional contact portion of the disks, a facing of cotton duck upon each face of the ring, and rivets passing through and securing the two facings of the ring together within the openings, said openings being each of greater area than the area of either head of each rivet.

In testimony whereof I affix my signature in presence of two witnesses.

SAMUEL M. D. MILLER.

Witnesses:
LEWIS E. FLANDERS,
ANNA M. DORR.